United States Patent Office 3,642,696
Patented Feb. 15, 1972

3,642,696
METHOD OF PREPARING POLYBENZIMIDAZOLE-AMIDES
Guy Rabilloud, Bernard Sillion, and Gabriel de Gaudemaris, Grenoble, France, assignors to Institut Francais du Petrole, des Carburants et Lubrifiants, Rueil-Malmaison, Hauts-de-Seine, France
No Drawing. Filed July 5, 1966, Ser. No. 562,529
Claims priority, application France, July 7, 1965, 23,853
Int. Cl. C08g 20/20, 33/02
U.S. Cl. 260—47 CP
6 Claims

ABSTRACT OF THE DISCLOSURE

For producing benzimidazole-type polymers and composite products of inert solid material with said polymers, there are provided two alternative processes comprising the reaction of an aromatic tetramine with either (A) a bis-ester of the formula:

$R_1O_2C—Ar—NH—CO—Ar'—CO—NH—Ar—CO_2R_1$ or (B) a primary diamide of the formula:

$H_2N—CO—Ar—NH—CO—Ar'—CO$
  $—NH—Ar—CO—NH_2$, wherein

Ar and Ar' represent aryl of 6 to 18 carbon atoms containing 0 to 3 heterocyclic atoms selected from the group consisting of nitrogen, oxygen, and sulfur, said Ar and Ar' having their two free valences in separate positions of the aromatic nucleus; and
$R_1$ represents a monovalent hydrocarbon radical.

For producing the impregnated products, a two stage system is employed wherein a prepolymer in an inert organic solvent is used to impregnate solids, and the resultant impregnated solid is cured at a higher temperature to complete polymerization.

---

This invention relates to novel nitrogen-containing heat-resistant polymers.

It is already known that polybenzimidazoles of a high molecular weight exhibit a particularly high thermal stability. These polymers, which are unusually strong and resistant to high temperatures, are relatively expensive because it is necessary to use relatively expensive starting materials for their production. For example, it is usually necessary to employ aromatic tetramines, particularly diaminobenzidine, which are condensed with aromatic dibasic acids or derivatives thereof, principally the diesters.

A principal object of this invention, therefore, is to provide polymers having substantially the same mechanical and thermal properties as polybenzimidazoles, but which can be produced at a lower cost.

Another object of this invention is to provide novel intermediate products for the production of the relatively inexpensive polymers of this invention.

Still another object is to provide a process for the production of the novel polymers of this invention.

Upon further study of the specification and claims, other objects and advantages of the present invention will become apparent.

To attain the objectives of this invention, a portion of the benzimidazole groups is replaced in the polymeric chain by aromatic amides. These aromatic amides are produced from aromatic diamines which are substantially less costly than the corresponding tetramines. These products which have substantially the same mechanical and thermal properties as polybenzimidazoles can be used for the same applications, for example, as adhesives, laminates, or reinforced structures.

To produce polymers of this invention, a bis-ester of Formula A is reacted with an aromatic tetramine containing two sets of ortho diamino groups of Formula B according to the following equation:

$nR_1O_2C—Ar—NH—CO—Ar'—CO—NH—Ar—CO_2R_1 + n$ 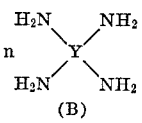

(A)                                                                                              (B)

$2nH_2O + 2nR_1OH + $ 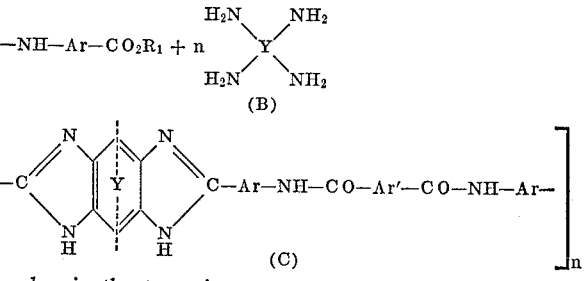

(C)

wherein the two nitrogen atoms of each imidazole ring are attached to adjacent carbon atoms of Y and wherein
$R_1$ represents a monovalent hydrocarbon radical, for example, alkyl or preferably aryl, and particularly phenyl; said radical generally containing 1 to 12 carbon atoms;

Ar and Ar', being identical or different, represent aromatic radicals which are either homocyclic or heterocyclic, and wherein the connecting valences are at two different positions of the aromatic nucleus;

n is an integer of at least about 2, probably higher than 5;

Y represents at least one homocyclic or heterocyclic aromatic nucleus.

Since n cannot be measured directly, the new polymers may be characterized by their inherent viscosity when they are sufficiently soluble in solvents to allow such a determination.

Prepolymers such as described hereafter exhibit intrinsic viscosities of about 0.02–0.14 in a 0.5% by weight solution thereof in dimethylsulfoxide at 30° C., whereas polymers of Formula C resulting from heating prepolymers at temperatures of at least 300° C., exhibit intrinsic viscosities higher than 0.14 in the same conditions, preferably higher than 0.20. After sufficient heating the polymers become substantially insoluble.

To obtain compound (A), it is possible to react an aromatic diacyl dihalide, preferably a dichloride, with an ester of an aromatic amino acid, preferably a phenyl ester. This reaction is represented as follows:

$2 H_2N—Ar—CO_2R_1 + Ar'(COX)_2 \rightarrow 2 HX + R_1O_2C$
  $—Ar—NH—CO—Ar'—CO—NH—Ar—CO_2R_1$ (A)

wherein

X is halogen, preferably chlorine, and the other radicals are defined as above.

In the preceding reaction, it is preferable to employ stoichiometric quantities of the reactants, but it is also possible to use an excess of either reactant, if desired.

Such excess is then separated from the polymer upon the termination of the reaction.

The reactants can be condensed to form compound (A) in the presence or absence of a solvent. If a solvent is used, however, it is preferred to employ an inert polar organic solvent, such as, for example, N-methyl pyrrolidone, dimethyl formamide, dimethyl acetamide, hexamethyl phosphoramide, or analogs thereof.

Any convenient reaction temperature can be employed, but because the reaction is generally very rapid, it is advantageous to employ a temperature lower than 20° C. Furthermore, it is preferred to conduct the reaction in the presence of an acid acceptor, such as a tertiary amine, for example, triethylamine, or a heterocyclic compound, such as pyridine. In this way, the effect of the formed hydrohalic acid is removed from the reaction milieu.

Product (A) formed in the preceding reaction can be precipitated by the addition of a non-solvent, such as water, ether, or ethanol, which is miscible with the polar organic solvent. The precipitated product can then be purified by recrystallization in an inert polar organic solvent before being reacted with the aromatic tetramine. It is also possible to eliminate the step of isolating the formed product (A), but then it is preferred to remove any precipitated halohydrate from the reaction solution. Using the latter technique, the aromatic tetramine is added to the resultant solution and it is preferred in this connection to employ proportions of 1 mol of dihalogenide to 2 mols of amino ester, and then to add to the resultant reaction solution 1 mol of aromatic tetramine.

It is preferred to conduct the polycondensation reaction $(A+B=C)$ in an inert polar organic solvent, that is, an organic solvent which is inert under the reaction conditions, said solvent molecules containing carbon, hydrogen, and at least one heteroatom, such as O, S, P and/or N. Such solvents are, in particular, ethers, sulfoxides, sulfones, per-nitrogen-substituted amides, aromatic nitrogen-containing heterocyclic bases, and phenols. Of such solvents, it is more preferred to use those having a high boiling point, for example, dimethyl sulfoxide, N-methyl pyrrolidone, dimethyl formamide, dimethyl acetamide, phenol, cresol, xylenol, phenyl oxide, hexamethyl phosphoramide, pyridine, and analogs thereof. The amount of solvent that is employed is not critical; for example, for one part by weight of the mixture of reactants, there can be employed about 0.5–20 parts by weight of solvent.

The resulting mixture is heated to about 100–300° C., preferably above 150° C., more particularly 190–220° C., until the desired viscosity is attained. In this connection, it is desirable to produce products having an intrinsic viscosity of about 0.02–0.14, partcularly 0.05 to 0.09, as measured in a 0.5% by weight solution in dimethylsulfoxide at 30° C. Such polymers of low intrinsic viscosity are hereinafter designated as prepolymers.

The reaction time for polymerization can be varied in accordance with the nature of the solvent, the temperature, the initial concentration of the solution, and the desired viscosity of the product. Generally, the reaction time is variable between about 1 and 10 hours.

At this stage, the product is not highly polymerized, and as such, is particularly suitable for the preparation of laminates or agglomerates under conditions which will be explained in greater detail below. Nevertheless, it is possible to isolate the prepolymer either by evaporating the solvent, or by precipitating the polymer with a non-solvent, such as ether or water. The precise chemical nature of the prepolymer has not been determined, but if it is subjected to a thermal treatment at above 300° C., for example, at 350–400° C., for 1–10 hours, there is obtained a final polymer of Formula C containing alternating amide groups and benzimidazole rings. The formation of this polymer is illustrated by the following reaction which involves a phenyl diester and diamino-3,3′-benzidine:

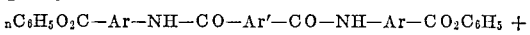
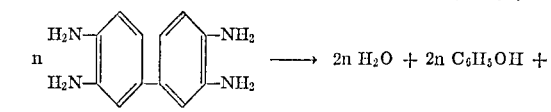
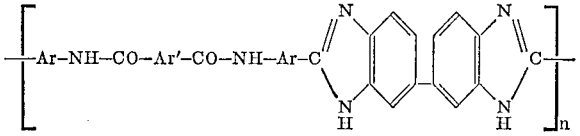

wherein $n$ is as hereinbefore defined.

When the thermal treatment is conducted in conjunction with the utilization of a prepolymer for the production of laminates or to impregnate other materials, the final polymeric product is analogous to that described above, depending upon the starting materials, of course.

For manufacturing consumer or industrial items, there is beneficially employed a 5–80% by weight solution of the prepolymer in an organic polar solvent. This solution can then be mixed with (impregnated, coated, blended and the like) a reinforcing material which is any inert solid generally in the form of powder, fibers filaments or films. The resultant mixture can then be subjected to any conventional shaping operation, such as molding, extrusion, calendering, etc.

As the reinforcing materials, it is preferred to employ glass fiber or glass cloth, asbestos, organic fibers, silica, carbon fibers, or metallic cloth. Such compositions generally contain about 1–70% by weight of the prepolymer, the remaining portion being composed of the reinforcing solid, solvent, and various conventional additives. These compositions are then subjected to a heating step at a temperature higher than 300° C. in order to evaporate the solvent and form the final polymer (C). It is preferred to conduct this latter step under pressure, for example between platens. There is thus obtained an article of commerce containing about 2–80% by weight of polymer (C), the remainder being composed of the reinforcing solid and additives.

A second method for producing the polymers of this invention comprises the reaction of a primary diamide of Formula D with a tetramine, in accordance with the following reaction:

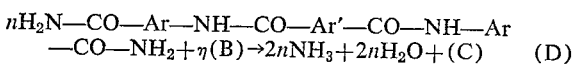

The operating conditions are the same as those described in connection with the first method of polymerization. In particular, one can employ solutions of the prepolymer having the precedingly indicated viscosity in order to impregnate or agglomerate reinforcing solids, and then subject the resultant mixture to a final thermal treatment, as indicated above.

A variety of starting materials can be employed to produce the polymers of this invention. The next section represents representative examples of such materials.

STARTING MATERIALS FOR THE PRODUCTION OF THE POLYMER (1) Dihalogenides (diacyl dihalides)

All dihalogenides of aromatic dicarboxylic acids can be employed, particularly the acid dichlorides. The aromatic portion can be homocyclic or heterocyclic, generally containing 6 to 18 carbon atoms, and 0 to 3 heterocyclic atoms selected from the group consisting of oxygen, nitrogen, and sulfur. Preferred examples include dichlorides or dibromides of orthophthalic acid, isophthalic acid, terephthalic acid, pyridine-2,5-dicarboxylic acid, pyridine-2,6-dicarboxylic acid, pyridine-3,5-dicarboxylic acid, naphthalene-1,4-dicarboxylic acid, naphthalene-1,6-dicarboxylic acid, naphthalene-2,6-dicarboxylic acid, pyrazine-2,5- dicarboxylic acid, furane-2,5-dicarboxylic acid, quinoline-2,6-dicarboxylic acid, and thiophene-2,5-dicarboxylic acid, as well as the homologs and analogs thereof.

In addition to the precedingly described halogenates of aromatic dicarboxylic acids of which the two carboxyl groups are attached to the same aromatic nucleus, it is possible to use halogenides wherein the carboxyl groups are attached to separate aromatic nuclei. For example, two aromatic nuclei can be separated by a carbon-carbon bond, or an ether, sulfur, sulfoxide, sulfone, carbonyl, or methylene group, as well as other groups and bonds. For example, it is possible to employ dihalogenides of such acids as biphenyl-4,4′-dicarboxylic acid, diphenylether-4,4′-dicarboxylic acid, diphenyl-methane-4,4′-dicarboxylic acid, diphenyl-sulfide-3,3′-dicarboxylic acid, diphenyl-sulfoxide-3,3′-dicarboxylic acid, diphenyl-sulfone-4,4′-dicarboxylic acid, and benzophenone-4,4′-dicarboxylic acid.

(2) Esters of aromatic amino acids

All esters of aromatic amino acids can be employed in this invention, whether they be homocyclic or heterocyclic. In general, however, the alcohol portion of the ester should contain about 1 to 12 carbon atoms, and the aromatic nucleus should contain about 6 to 18 carbon atoms, and 0 to 3 heterocyclic atoms selected from the group consisting of nitrogen, oxygen, and sulfur. The most preferred esters in this connection are phenyl esters, particularly phenyl esters of para-aminobenzoic acid, meta-aminobenzoic acid, amino-3-naphthoic acid, amino-5-naphthoic acid, amino-6-carboxy-3-pyridine, and the homologs and analogs thereof.

As in the case of the dihalogenides, it is also possible to employ esters of aromatic amino acids wherein the amine group is on one aromatic nucleus, and the carboxyl group on another, the two aromatic nuclei being separated by, for example, a carbon-to-carbon bond, an ether linkage, or a methylene group or other various bonds and linkages as defined above. Examples of such esters of aromatic amino acids include the phenyl esters of amino-4′-carboxy-2-biphenyl, amino-4′-carboxy-4-diphenyl ether, amino-4′-carboxy-2-diphenyl sulfide, amino-4′-carboxy-4-benzophenone, amino - 3′ - carboxy-3-diphenylsulfoxide, amino-3′-carboxy-3-diphenylsulfone and amino - 4′ - carboxy-4-diphenyl-methane.

(3) Aromatic tetramines

The aromatic tetramines are those which contain two reactive ortho-diamino sites. Such compounds can have two reactive sites on the same aromatic nucleus, said nucleus being either a single ring, or a condensed polycyclic ring structure, an example of the former being tetramino-1,2,4,5-benzene, and an example of the latter being tetramino-2,3,6,7-naphthalene.

Again, as in the two previous reactants, it is possible to have the reactive sites on two different rings, these rings being separated by, for example, a carbon-to-carbon bond, an ether bond, a methylene group, or any other group or bond as defined above. Preferred compounds in this connection are diamino-3,3′-benzidine, tetramino-3,3′,4,4′-diphenyl ether, tetramino-3,3′,4,4′-diphenylmethane, tetramino-3,3′,4,4′-diphenyl-sulfide, and tetramino-3,3′,4,4′-diphenyl-sulfone, as well as the various homologs and analogs thereof.

Each ring can either be homocyclic, as above, or heterocyclic as in the case of tetramino-2,3,5,6-pyridine, for example.

(4) Bis-esters of Formula A

As the bis-esters of Formula A, there can be used any of the bis-esters which can be produced on the basis of the previously described starting materials of dihalogenides, on the one hand, and esters of amino acids, on the other hand. However, the mechanical and thermal properties of the finally produced polymer are better if phenyl esters are used instead of alkyl esters. Particularly preferred bis-esters of Formula A include:

bis-(phenoxycarbonyl-4-phenyl)-N,N′-isophthaldiamide
bis-(phenoxycarbonyl-4-phenyl-N-carbamoyl)-4,4′-diphenyl ether
bis-(phenoxycarbonyl-3-phenyl)-N,N′-terephthaldiamide
bis-(phenoxycarbonyl-3-phenyl)-N,N′-isophthaldiamide
bis-(p-tolyloxycarbonyl-4′-biphenyl-4)-N,N′-pyridyl-3,5-dicarboxamide
bis-(ethoxycarbonyl-4-phenyl)-N,N′-isophthaldiamide

(5) Diamides of Formula D

With respect to the diamides of Formula D, the preceding description of the various possible moieties is also applicable to the amides. As preferred examples of the amides, there are included the following:

bis-(carbamoyl-4-phenyl)-N,N′-isophthaldiamide
bis-(carbamoyl-3-phenyl)-N,N′-tetrphthaldiamide
bis-(carbamoyl-4-phenyl-N-carbamoyl)-4,4′-diphenyl-ether
bis-(carbamoyl-3-phenyl)-N,N′-pyridine-2,6 dicarboxamide
bis-(carbamoyl-4-phenyl)-N,N′-naphthalene-1,5 dicarboxamide All of the described reactants can be used either individually or as mixtures to form either homopolymers or mixed polymers.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever. In these examples, the intrinsic viscosities are those which were determined at 30° C. in a 0.5% by weight solution of the polymer in dimethyl sulfoxide.

EXAMPLE 1

Bis-(phenoxycarbonyl-4-phenyl)-N,N′-isophthaldiamide

After formulating a solution of 6.39 g. (0.03 mol) of phenyl para-amino benzoate, and 9 cc. of triethylamine in 60 cc. of dimethyl acetamide, the resultant solution is cooled to $-15°$ C. Thereupon, there is added in one dosage a solution of 3.04 g. (0.015 mol) of isophthaloyl chloride in 20 cc. of dimethyl acetamide. The resultant mixture is agitated 5–10 minutes at the low temperature, and then 45 minutes at ambient temperature.

A white crystalline precipitate of triethylamine chlorohydrate is filtered out of the solution, and the remaining filtrate is taken up in a large volume of water (600–800 cc.). By virtue of the latter step, there is formed a precipitate of a white pasty composition which is isolated by filtration, washed with ethanol, followed by washing with ether, and then dried at 100° C. under vacuum. The resultant bis-(phenoxycarbonyl-4-phenyl)-N,N′- isophthaldiamide is purified by recrystallization from nitrobenzene to give a total yield of 64%; alternatively, it is recrystallized from a mixture of equal volumes of ethanol and dimethyl formamide to obtain a total yield of 59%. The melting point of the recrystallized substance is 301° C.

Poly-isophthaldi(amido-4-phenyl)-2,2′-bibenzimidazole-5,5′

In 10 cc. of dimethyl sulfoxide, there are dissolved 2.78 g. ($5 \cdot 10^{-3}$ mol) of the resultant compound obtained in the preceding reaction. This solution is then deaerated by the use of bubbling argon for a period of 3 hours at a temperature of approximately 100° C.

To the de-aerated solution is added 1.07 g. ($5 \cdot 10^{-3}$ mol) of diamino-3,3′-benzidine, and the resultant solution is then maintained at 190–200° C. for a period of 3 hours. Thereupon, 3 cc. of the solvent is evaporated to yield a polymer having an intrinsic viscosity of about 0.08. This resultant solution is employed to impregnate glass cloth so as to obtain a composite product of cloth and resin, containing about 30% by weight of dry resin. The solvent is evaporated by placing the composite product in a vacuum oven at 120° C. for several hours. The resultant solvent-free impregnated glass cloth is then cut to the desired form. 16 layers of such impregnated cloth are superimposed one on the other and formed under pressure in two steps, under the following conditions:

| Step | Temperature, ° C. | Pressure | Time under pressure |
|---|---|---|---|
| 1 | 120 | Contact | 15 minutes. |
| 2 | 360 | 15 kg./cm.$^2$ | 3 hours. |

The finally obtained laminate contains 30% by weight of resin, and has a resistance to rupture of 42–46 kg./mm.$^2$

EXAMPLE 2

Bis-[phenoxycarbonyl-4-phenyl-N-carbamoyl]-4,4'-diphenyl-ether

Example 1 is followed while adding a solution of 8 g. of bis-chloroformyl-4,4'-diphenyl-ether in 30 cc. of dimethyl formamide to a cooled mixture of 11.2 g. of phenyl para-amino-benzoate, 15 cc. of triethylamine, and 80 cc. of dimethyl formamide. After recrystallization from a mixture of ethanol and dimethyl formamide, a yield of the above-designated product of 65% is obtained, the product having a melting point of 325° C.

Poly-oxy-4,4'-bi-(phenylene-amido-4-phenyl)-2,2'-bibenzimidazole-5,5'

Polycondensation under an inert atmosphere is accomplished with 2.4 g. of bis-[(phenoxycarbonyl-4-phenyl)-N-carbamoyl]-4,4'-diphenyl-ether and 0.79 g. of diamino-3,3'-benzidine in a solution of 10 cc. of dimethyl sulfoxide. The mixture is maintained at reflux temperature (190–200° C.) for about 3 hours. The intrinsic viscosity of the resultant polymer is about 0.10. The mixture is then employed to impregnate 8.1 g. of glass cloth.

The impregnated cloth is treated as in Example 1, yielding test samples having 25% by weight of resin, and which exhibit a rupture strength of about 45–50 kg./mm.$^2$

EXAMPLE 3

Bis-(phenoxycarbonyl-3-phenyl)-N,N'-isophthaldiamide

Example 1 is repeated with 14.91 g. (0.07 mol) of phenyl meta-amino-benzoate and 7.1 g. (0.035 mol) of isophthaloyl chloride. The reaction product, after being recrystallized from nitrobenzene, exhibits a melting point of 219° C.

Poly-isophthaldi-(amido-3-phenyl)-2,2'-bibenzimidazole-5,5'

15 g. of the above diamide and 5.8 g. of diamino-3,3'-benzidine are polymerized in 40 cc. of dimethyl sulfoxide by heating the mixture to 190–200° C. for 3 hours. The polymer having an intrinsic viscosity of 0.09 is then employed in the resulting solution to impregnate glass cloth. The ruptural strength of the test samples produced as in Example 1 and having 30% by weight of resin is about 45–48 kg./mm.$^2$

EXAMPLE 4

Operating as in Example 2 with phenyl meta-amino-benzoate and bis-chloroformyl-4,4'-diphenyl-ether, there is thus obtained bis-[(phenoxy-carbonyl-3-phenyl)-N-carbamoyl]-4,4'-diphenyl-ether, which is then recrystalized from nitrobenzene and exhibits a melting point of 199° C.

A polymer is then obtained based on equal molar proportions of the above ether and diamino-3,3'-benzidine. Following Example 2, the finally produced test samples exhibit a ruptural strength of about 50–52 kg./mm.$^2$

EXAMPLE 5

There is cooled to a temperature of −10° C. a solution of 12.78 g. (0.06 mol) of phenyl meta-amino-benzoate and 7 g. of triethylamine in 150 cc. of N-methyl pyrrolidone. This solution is agitated vigorously, and thereupon there are added in a single dosage and in the form of a mixture, 4.06 g. (0.02 mol) of isophthaloyl chloride and 2.03 g. (0.01 mol) of terephthaloyl chloride dissolved in 50 cc. of N-methyl pyrrolidone. The mixture is agitated for a period of about 15 minutes at −10° C. and then for 2 hours at an ambient temperature of 20° C. Precipitated triethylamine chlorohydrate is filtered out of the solution. To the resultant clear filtrate, there are added 6.42 g. (0.03 mol) of diamino-3,3'-benzidine.

The resultant solution is brought to a boil under atmospheric pressure to distill about 100 ml. of solvent from the solution. Finally, the remaining solution is heated at reflux for about 3 hours, thereby obtaining a polymer having an intrinsic viscosity of about 0.07.

The finally obtained solution is then employed to impregnate glass cloth as in the previous examples. The trimmed test samples having 25% by weight of polymer exhibit a ruptural strength of 49–53 kg./mm.$^2$

EXAMPLE 6

Proceeding as in the previous example, in a solvent of methyl pyrrolidone, 6.39 g. of phenyl para-amino-benzoate is reacted with 3.04 g. of isophthaloyl chloride. After the triethylamine chlorohydrate precipitated is removed from the solution, there are added 3.21 g. of diamino-3,3'-benzidine. The resultant solution is maintained under reflux conditions for about 4 hours, thereafter the solvent is distilled off. There is thus obtained a yellow-orange product of which the intrinsic viscosity is 0.14. This product is pulverized in a mortar, and then heated for about 2 hours at 250° C. under an inert atmosphere (intrinsic viscosity: 0.21), then for an additional one hour period at 300° C. (intrinsic viscosity: 0.30). The polymer is pulverized a second time, and then heated under a vacuum of 0.05 mm. Hg at 300° C. for a period of one hour, at 350° C. for an additional hour, at 375° C. for another hour, and finally at 400° C. for 30 minutes.

This polymer is then tested under an inert atmosphere to determine its temperature resistance. At 400° C., a weight loss of 1% is observed, and at 500° C. a weight loss of 10%. In the presence of air, there is observed a rather rapid oxidation, and the loss in weight is 3.5% at 400° C., and 35% at 500° C. These tests indicate that laminates made on the basis of the polymers of this invention are particularly heat-resistant.

EXAMPLE 7

Under the same conditions as in Example 1, bis(carbamoyl) - 2 - phenyl) - N,N'-isophthaldiamide is prepared by reacting 0.06 mol of meta-amino-benzamide with 0.03 mol of isophthaloyl chloride.

A prepolymer is prepared by starting with 8.05 g. (0.02 mol) of the above diamide, and 4.28 g. (0.02 mol) of diamino-3,3'-benzidine, in the same manner as described in Example 1. The resultant prepolymer is then used to fabricate laminates, the final product exhibiting a flexural strength at rupture of about 47 kg./mm.$^2$ The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for the production of a polymer consisting essentially of recurring units of the formula:

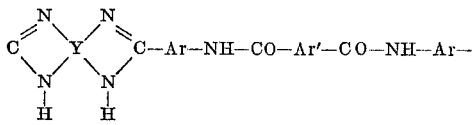

wherein the two nitrogen atoms of each imidazole ring are attached to adjacent carbon atoms of Y and wherein Ar and Ar' represent an aromatic radical of 6 to 18 carbon atoms containing 0 to 3 heterocyclic atoms selected from the group consisting of nitrogen, oxygen, and sulfur, said Ar and Ar' having their two free valences in separate positions of the aromatic nucleus;

Y represents an aromatic radical of 6 to 18 carbon atoms containing 0 to 3 heterocyclic atoms selected from the group consisting of nitrogen, oxygen, and sulfur;

wherein a bis-ester of the formula $R_1O_2C$—Ar—NH—CO—Ar'—CO—NH—Ar—$CO_2R_1$ is reacted at above 150° C. with an aromatic tetramine containing two sets of ortho diamines groups of the formula

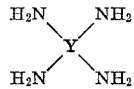

wherein $R_1$ represents a monovalent hydrocarbon radical of 1–12 carbon atoms.

2. A process to produce a polymer consisting essentially of recurring units of the formula:

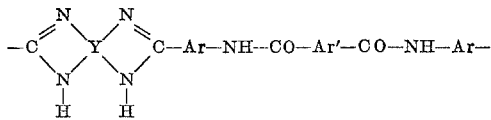

wherein the two nitrogen atoms of each imidazole ring are attached to adjacent carbon atoms of Y and wherein Ar and Ar' represent an aromatic radical of 6 to 18 carbon atoms containing 0 to 3 heterocyclic atoms selected from the group consisting of nitrogen, oxygen, and sulfur, said Ar and Ar' having their two free valences in separate positions of the aromatic nucleus;

Y represents an aromatic radical of 6 to 18 carbon atoms containing 0 to 3 heterocyclic atoms selected from the group consisting of nitrogen, oxygen and sulfur;

said process comprising the step of reacting at above 150° C. a primary diamide of the formula:

$H_2N$—CO—Ar—NH—CO—AR'—CO—NH—Ar—CO—$NH_2$ with an aromatic tetramine containing two sets of ortho diamines groups of the formula:

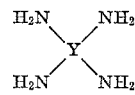

3. A process for the production of impregnated materials comprising impregnating inert solids with a polymer consisting essentially of recurring units of the formula:

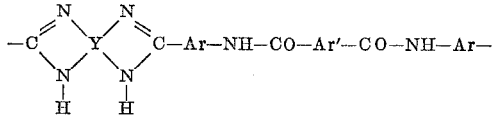

wherein the two nitrogen atoms of each imidazole ring are attached to adjacent carbon atoms of Y and wherein Ar and Ar' represent an aromatic radical of 6 to 18 carbon atoms containing 0 to 3 heterocyclic atoms selected from the group consisting of nitrogen, oxygen, and sulfur, said Ar and Ar' having their two free valences in separate positions of the aromatic nucleus;

Y represents an aromatic radical of 6 to 18 carbon atoms containing 0 to 3 heterocyclic atoms selected from the group consisting of nitrogen, oxygen, and sulfur;

said polymer having an intrinsic viscosity of 0.02–0.14 measured as an 0.5% by weight solution thereof in dimethylsulfoxide at 30° C.;

and heating the impregnated mass to at least 300° C. to complete the polymerization reaction and increase the intrinsic viscosity of the polymer to a value of at least 0.2.

4. A process as defined by claim 1 wherein the reaction is conducted in an inert polar organic solvent.

5. A process as defined by claim 1 wherein $R_1$ is phenyl.

6. A process as defined by claim 3 wherein said polymer employed for impregnating is used in the form of a solution thereof in an inert organic solvent.

References Cited

UNITED STATES PATENTS

| | | | |
|---|---|---|---|
| 3,267,081 | 8/1966 | Rudner et al. | 260—78.4 |
| 3,301,828 | 1/1967 | Marvel et al. | 260—78.4 |
| 3,313,783 | 4/1967 | Iwakura et al. | 260—78 |
| 3,484,407 | 12/1969 | Preston | 260—47 |
| 3,503,929 | 3/1970 | Loudas | 260—47 |
| 3,094,511 | 6/1963 | Hill et al. | 260—78 |

OTHER REFERENCES

Iwakura et al., Polybenzimidazoles, Polyamides Containing Benzimidazole Rings, Makromoleculore Chemie, vol. 77, pp. 41–50 (1964).

WILLIAM H. SHORT, Primary Examiner

L. L. LEE, Assistant Examiner

U.S. Cl. X.R.

117—123 D, 124 E, 126 GR, 132 B; 161—197, 205, 206, 214; 260—30.8 DS, 78 TF, 78.4 R, 78.4 E